United States Patent Office 3,276,856
Patented Oct. 4, 1966

3,276,856
HERBICIDAL COMPOSITIONS
James E. Esposito, Ambler, Pa., assignor to Amchem Products, Inc., Ambler, Pa., a corporation of Delaware
No Drawing. Filed Mar. 22, 1965, Ser. No. 441,881
6 Claims. (Cl. 71—2.6)

The present invention relates to herbicidal compositions and more particularly it relates to an improved composition having a high level of active herbicidal ingredient and improved emulsification properties.

The use of various plant hormones, particularly hormone acids for controlling undesirable vegetation is a well established industrial practice. Principally used herbicides in the industry are the halo, alkyl, haloalkyl, and amino substituted pyridyl, phenyl and phenoxyalkanoic acids such as, for example, 4-chloro-2-methylphenoxyacetic acid; 2,4-dichloro and 2,4,5-trichlorophenoxyacetic acids; α-(2,4-dichlorophenoxy)- and α-(2,4,5-trichlorophenoxy)-propionic acids; γ-(2,4,5-trichlorophenoxy)-butyric acid; 2-methoxy-3,6-dichlorobenzoic acid; 2-methoxy-3,5,6-trichlorobenzoic acid; 2,3,6-trichlorophenylacetic acid; 2,3,6-trichlorobenzoic acid; 2,3,5-triiodobenzoic acid; 2,5-dichloro-3-aminobenzoic acid; and 4-amino-3,5,6-trichloropicolinic acid.

Normally these herbicidal acids, in view of their substantial water insolubility and their low level of solubility in commercial agricultural solvents, are employed in the form of a derivative, such as, for example, an alkali metal or ammonium salt, an amine salt or as an ester.

Where it is desired to utilize an oil formulation of a herbicide, it has been the practice in the art to employ esters or high molecular weight amine salts in view of the greater ease in dissolving such derivatives in agricultural oils. This procedure, although generally utilized in the herbicide art, is not completely satisfactory for various reasons. For example, ester and amine formulations have necessitated the use of highly refined and specialized emulsifying agents which are very expensive and which add appreciably to the cost of the formulation. Frequently the cost of the emulsifying agent in a given formulation exceeds the cost of the active herbicidal component contained therein, so that the economics of a given herbicidal formulation might be dictated more by the additives employed than the actual active component utilized therein.

It is also known in the herbicidal art that these highly refined and specialized emulsifying agents are frequently subjected to chemical degradation by acidic components contained in the herbicidal compositions. This degradation not only results in the destruction of the essential emulsifying component, thereby yielding a formulation which will not emulsify upon field application, but it also results in reduced storage stability for such compositions thereby greatly increasing the problems encountered in attempting to ship and/or store such compositions from one season to the next.

So far as the high molecular weight amine salt herbicidal compositions are concerned these possess a lower amount of active herbicidal component than do ester formulations, so that a greater amount of herbicidal composition is needed in order to achieve the same total amount of herbicide application. Moreover, the amine salt formulations have proven undesirable in view of the toxic nature of some of the amine components employed, and also in view of corrosion problems associated with the storage and shipment of amine-type formulations.

It is also well known in the herbicidal art that while conventional oil-in-water emulsions are relatively easy to form prior to use in field application, the preferred water-in-oil type emulsions, that is emulsions wherein the oil is a continuous phase, are difficult to prepare and require an appreciable amount of work input by way of stirring and/or shearing in order to form the desired type of emulsions. This, of course, necessitates the employment of specially trained personnel and the use of specialized equipment which is not always available at the site of herbicide application.

Beyond the foregoing difficulties experienced in prior art formulations of active herbicide acids and derivatives thereof, it is also well recognized that many of the derivatives of these herbicide acids possess "biological" volatility, whereby vegetation which has not been directly contacted with the herbicidal component, but which is growing in fields near the site of application, has been found to be seriously injured and, indeed, in some cases totally destroyed by the use of such herbicidal agents.

With the foregoing in mind the principal object of the present invention is the provision of a novel herbicidal composition which is readily emulsifiable and which possesses inherent self-emulsification properties thereby obviating the need for employment of expensive and highly refined emulsifying agents, or specialized equipment and personnel.

A concomitant object of the present invention is the provision of a novel herbicidal composition which contains a high level of active herbicidal ingredient as compared with prior art formulations.

A further object of the present invention is the provision of a herbicidal composition which possesses no "biological" volatility and thereby will present no hazzard to valuable crops growing in the area of herbicide application.

Yet another object of this invention is the provision of a stable, concentrated herbicidal formulation which possesses infinite storage life and which will withstand repeated freeze-thaw cycles.

The present invention is based upon the surprising discovery that a salt formed by the reaction between a plant hormone acid selected from the group consisting of halo, haloalkyl, alkyl, alkoxy and amino substituted pyridyl, phenyl and phenoxy alkanoic acids with a tertiary amine having the formula:

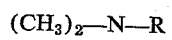

$$(CH_3)_2\text{—N—R}$$

wherein R is selected from the group consisting of straight chain alkyl and alkenyl radicals having from 12 to 18 carbon atoms, is capable of dissolving appreciable quantities of excess free herbicide acid over and above that amount which stoichiometrically is required to react with the amine present therein to form the amine salt, thereby forming a concentrated herbicidal composition containing high levels of active herbicide ingredient and possess self-emulsifying properties.

The plant hormone acids which can be utilized in the formulations of the compositions of the present invention include the halo, alkyl, haloalkyl, alkoxy, nitro and amino substituted pyridyl, phenyl and phenoxyalkanoic acids including, for example, 4-chloro-2-methylphenoxyacetic acid;
4-chloro-2-methylphenoxypropionic acid;
2,4-dichlorophenoxyacetic acid;
2,4,5-trichlorophenoxyacetic acid;
α-(2,4-dichlorophenoxy)-propionic acid;
α-(2,4,5-trichlorophenoxy)-propionic acid;
γ-(2,4,5-trichlorophenoxy)-butyric acid;
2-methoxy-3,6-dichlorobenzoic acid;
2,3,6-trichlorophenylacetic acid;
2,3,6-trichlorobenzoic acid;
2,3,5-triiodobenzoic acid;
2,5-dichloro-3-aminobenzoic acid; and
4-amino-3,5,6-trichloropicolinic acid.

The amount of such hormone acid which is employed will be that amount which stoichiometrically is required to form the amine salt, plus at least 17% excess free acid over and above this stoichiometric requirement. The exact amount of excess acid will depend upon the solubility characteristics of the particular system employed. For example, more or less of a particular herbicide acid will be soluble in a particular amine salt formulation of the same acid, and different solubility characteristics will generally be encountered in dissolving a free herbicidal acid of the class described into an amine salt formulation of a different herbicide acid. As a specific illustration, using the N,N-dimethyloctadecadienyl amine salt of 2,4,5-trichlorophenoxyacetic acid, it is possible to dissolve at least 124% excess free 2,4,5-trichlorophenoxyacetic acid, although where a different free acid is utilized, such as, for example 2,4-dichlorophenoxyacetic acid, more or less of the free acid will be solubilized. Accordingly, the upper limit of free acid is controlled solely by solubility considerations of the particular salt and free acid used.

So far as concerns the lower limit of 17% excess free acid, over and above that amount which stoichiometrically is required to form the amine salt, surprisingly it has been found that use of lesser amounts do not provide stable formulations. For example, use of N,N-dimethyloctadecadienyl amine salt of 2,4,5-trichlorophenoxyacetic acid with no excess free acid based on stoichiometric considerations, yields a formulation which solidifies on standing at about 22° C. Moreover, when 10% excess 2,4,5-trichlorophenoxyacetic acid, based upon stoichiometric considerations, was added to this formulation, it was noted that the composition solidified at 5° C. However, when a total of 17% excess free acid, based on stoichiometric considerations, was incorporated into the amine salt, the resulting composition exhibited totally unexpected solubility and stability properties notwithstanding the high amount of excess free acid component, and such formulation successfully underwent repeated freeze-thaw cycles without any detriment to formulation stability.

With respect to the tertiary amine, this component must be selected from that group of saturated and unsaturated straight chain dimethyl alkyl amines having from 12 to 18 total carbon atoms in the alkyl chain. Typical amines falling within the scope of this invention include N,N-dimethyldodecylamine; N,N-dimethyltetradecylamine; N,N-dimethylhexadecylamine; N,N-dimethyloctadecenylamine; N,N-dimethyloctadecadienylamine.

The compositions of the present invention are prepared by dissolving the free hormone acid directly into the particular tertiary amine component desired to be used. If the amine is very viscous at room temperature, and difficult to flow, it may be warmed to higher temperatures in order to permit easier handling thereof. The preferred practice comprises utilization of a solution of the desired amine component in an agricultural oil to which the hormone acid is then added. However, utilization of an agricultural oil is not essential for the successful operation of the present invention, and normally is utilized where the viscosity of the particular amine employed or of the amine salt produced is such as to render difficult routine handling of the composition.

A preferred practice consists in the utilization of mixtures of commercially available amines falling within the scope of this invention. Such combinations include both saturated and unsaturated amines having long-chain alkyl groups of from 16 to 18 total carbon atoms. Amine admixtures of this type have given results which are completely acceptable and equivalent to those obtained using a single tertiary amine compound. Moreover, the use of commercially available mixtures of amines from the class described is a more economical practice and thus is preferred for this reason.

The agricultural oils which may, if desired, be utilized in preparing the novel, concentrated, herbicidal compositions of this invention include aromatic oils such as, methylated naphthalenes, kerosenes, and alkylated benzenes, such as xylenes and toluenes. The primary function of these agricultural oils is to lend fluidity to the herbicidal compositions which, in certain instances, tend to be very viscous and difficult to flow under normal handling conditions. Where such oils are utilized it is preferred to incorporate up to about 70% by weight thereof based upon the weight of the formulation. As noted hereinabove, however, formulations falling within the purview of this invention can be prepared without the benefit of the agricultural oil or co-solvent.

The discovery of this invention is particularly surprising when it is considered that commonly used herbicide acids are substantially insoluble, or at best, are only sparingly soluble, in agricultural oils so that the surprising solubility of the amine salt formulations is attributed solely to the salt compositions rather than to any oils which may be used. For example, 2,4-dichlorophenoxyacetic acid possesses solubilities at 28° C. as follows:

| Solvent: | Percent solubility |
|---|---|
| Methylated naphthalene | 0.45 |
| Kerosene | 0.35 |

Similarly, 2,5-dichloro-3-aminobenzoic acid possesses solubilities at 24° C. as follows:

| Solvent: | Percent solubility |
|---|---|
| Toluene | 0.08 |
| Methylated naphthalene | 0.1 |

Accordingly, the ability of the amine salts falling within the purview of the present invention to dissolve excess free acid, over and above that amount which stoichiometrically is required to form the amine salt, is attributed solely to the amine salt compound and is not in any way attributed to solvency properties of any agricultural oils which may be incorporated into the compositions of this invention.

In order to illustrate the surprising properties of the present invention there are presented below the results of several formulations which have been prepared in accordance with the teachings of this invention. It is to be understood, however, that these formulations are presented herewith solely by way of illustration and are not intended in any way to be construed as a limitation of this invention.

*Example I*

11.1 parts of N,N-dimethylhexadecylamine were added to 66.2 parts of methylated naphthalenes. To this admixture were then added 24 parts of 2,4,5,-trichlorophenoxyacetic acid, and the admixture was stirred at room temperature until complete solution was realized. This formulation contained 129% excess free acid over and above that amount which was stoichiometrically required to form the amine salt.

Upon simple admixture of this formulation with water in ratios of 1 part of the concentrated formulation to 3 parts of water—and using paddle mixing, there was rapidly formed a water-in-oil emulsion which was suitable, as is, for spray application.

*Example II*

| Ingredient: | Parts |
|---|---|
| 2,4,5-trichlorophenoxyacetic acid | 24.0 |
| N,N-dimethyloleylamine | 12.1 |
| Methylated naphthalene | 65.3 |

The components of Example II were admixed in the same manner as that described above for Example I to yield a formulation containing 127% of dissolved free acid. This formulation rapidly formed a water-in-oil emulsion upon admixture with water in ratios of from 1 part of the concentrate to from 1 to 4 parts of water.

*Example III*

20 parts of a commercial admixture of dimethylalkylamines, containing C-16 and C-18 saturated and unsaturated alkyl chain lengths, were added to 39.4 parts of methylated naphthalene. To this admixture were then added 12.1 parts of 2,4,5-trichlorophenoxyacetic acid, 17.5 parts of 2,4-dichlorophenoxyacetic acid and 18.4 parts of 2-methoxy-3,6-dichlorobenzoic acid, with stirring at room temperature until complete solution was realized. This formulation contains 89.1% of free herbicide acid and was found to be stable over successive freeze/thaw cycles and extended storage at ambient temperatures.

Upon simple admixture of this formulation with water in ratios of 1 part of the formulation to 2 parts of water there was rapidly formed a water-in-oil emulsion which was suitable for conventional spray application.

*Example IV*

Ingredient: Parts
2,4-dichlorophenoxyacetic acid _____ 24.0
N,N-dimethyldodecylamine _____ 18.0
Methylated naphthalene _____ 59.2

Free acid=35%.

*Example V*

Ingredient:
2,4-dichlorophenoxyacetic acid _____ 24.0
N,N-dimethyltetradecylamine _____ 18.0
Methylated naphthalene _____ 59.4

Free acid=49.1%.

*Example VI*

Ingredient:
2,4-dichlorophenoxyacetic acid _____ 18.0
N,N-dimethyloleylamine _____ 15.0
Methylated naphthalene _____ 54.8

Free acid=195%.

*Example VII*

49.5 parts of N,N-dimethyloleylamine were admixed with 12 parts of α-(2,4,5-trichlorophenoxy)-propionic acid dissolved in 20 parts of kerosene to obtain a clear solution of the herbicide acid salt. To this solution was then added 52.8 parts of 2,3,6-trichlorophenylacetic acid, with stirring at room temperature until complete solution was realized. The viscous, clear resulting concentrated formulation contained 57% of free acid over and above that amount stoichiometrically required to form the amine salt. Upon dilution with water in a ration of 1 part of the concentrated formulation to 3 parts of water there was rapidly formed a water-in-oil emulsion which was stable and suitable for use as is without further dilution.

*Example VIII*

Ingredient: Parts
α-(2,4-dichlorophenoxy)-propionic acid _____ 24.0
N,N-dimethyldodecylamine _____ 18.2
Methylated naphthalene _____ 56.5

Free acid=25%.

*Example IX*

Ingredient:
2,4,5-trichlorophenoxyacetic acid _____ 40.0
Commerical admixture of C-16 and C-18 saturated and unsaturated amines _____ 38.4
Methylated naphthalene _____ 88.6

Free acid=17%.

*Example X*

Ingredient:
γ-(4-chloro-2-methylphenoxy)-butyric acid ___ 24.0
N,N-dimethyloleylamine _____ 18.0
Methylated naphthalene _____ 54.7

Free acid=70.9%.

*Example XI*

Ingredient:
2,4,5-trichlorophenoxyacetic acid _____ 24.0
N,N-dimethyloctadecylamine _____ 12.1
Xylene _____ 35.1
Toluene _____ 30.0

Free acid=129%.

*Example XII*

Ingredient:
3-chlorophenoxyacetic acid _____ 24.0
N,N-dimethyloleylamine _____ 12.0
Methylated naphthalene _____ 60.1

Free acid=216.5%.

*Example XIII*

11 parts of a commercial admixture of dimethylalkyl amines containing C-16 and C-18 saturated and unsaturated alkyl chain lengths were added to 66.5 parts of methylated naphthalene. To this admixture, with stirring at room temperature, was added 24 parts of 2,4,5-trichlorophenoxyacetic acid and stirring was continued to complete solution. This formulation contained 146% dissolved free acid.

1 part of this formulation was mixed with 2 parts of kerosene, and to this admixture was then added 7 parts of water to form a water-in-oil emulsion which was suitable for application in conventional spray apparatus.

*Example XIV*

Ingredient: Parts
2,3,5-triiodobenzoic acid _____ 12.0
N,N-dimethyloleylamine _____ 4.0
Mixed alkylated benzenes _____ 81.4

Free acid=75.1%.

*Example XV*

Ingredient:
2,4,5-trichlorophenoxyacetic acid _____ 24.0
Mixed amines containing C-16 and C-18 saturated and unsaturated alkyl chains _____ 15.0
Methylated naphthalene _____ 32.3
Kerosene _____ 30.0

Free acid=81.2%.

*Example XVI*

Ingredient:
4-amino-3,5,6-trichloropicolinic acid _____ 6.0
N,N-dimethyloctadecenylamine _____ 6.0
Mixed xylene fractions _____ 80.0

Free acid=20.7%.

*Example XVII*

Ingredient:
2,4,5-trichlorophenoxyacetic acid _____ 24.0
Commercial admixture of C-16 and C-18 saturated and unsaturated amines _____ 23.1
Methylated naphthalene _____ 50.1

Free acid=18.1%.

*Example XVIII*

Ingredient:
4-amino-3,5,6-trichloropicolinic acid _____ 12.0
N,N-dimethyloctadecenylamine _____ 12.0
Mixed xylene fractions _____ 80.0

Free acid=20.7%.

From the formulations presented above it is apparent that is is possible within the purview of this invention to form concentrated herbicidal compositions possessing unusually high rates of active herbicidal component and, moreover, possessing self-emulsification properties heretofore unknown in the industry.

I claim:
1. A non-aqueous herbicidal concentrate comprising a herbicidally effective amount of an amine salt composition consisting of the reaction product of a tertiary amine of the formula:

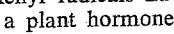

wherein R is selected from the group consisting of straight chain alkyl and alkenyl radicals having from 12 to 18 carbon atoms with a plant hormone acid selected from the group consisting of mono and polychloro, polyiodo, methyl, methoxy and amino substituted phenyl, and phenoxyalkanoic acids, wherein said plant hormone acid is present in an amount of at least 17% above that quantity which stoichiometrically is required to form the amine salt.

2. The amine salt composition of claim 1 wherein the tertiary amine component comprises admixture of straight chain alkyl and alkenyl amines having from 16 to 18 carbon atoms in said alkyl and alkenyl chains.

3. The composition of claim 1 wherein the plant hormone acid is 2,4-dichlorophenoxyacetic acid.

4. The composition of claim 1 wherein the acid is 2,4,5-trichlorophenoxyacetic acid.

5. The composition of claim 1 wherein the acid is 2-methoxy-3,6-dichlorobenzoic acid.

6. A non-aqueous herbicidal concentrate comprising a herbicidally effective amount of an amine salt composition consisting of the reaction product of a tertiary amine of the formula:

$$(CH_3)_2—N—R$$

wherein R is selected from the group consisting of straight chain alkyl and alkenyl radicals having from 12 to 18 carbon atoms with a herbicidally effective amount of a plant hormone acid selected from the group consisting of mono and polychloro, polyiodo, methyl, methoxy and amino substituted phenyl, and phenoxyalkanoic acids, wherein said plant hormone acid is present in an amount of at least 17% above that quantity which stoichiometrically is required to form the amine salt, said composition also comprising up to 70% by weight of a liquid inert diluent.

References Cited by the Examiner

FOREIGN PATENTS 857,387  12/1960  Great Britain.

OTHER REFERENCES

Dickinson, U.S. published application 143,340, filed February 9, 1950, published September 23, 1952.

LEWIS GOTTS, *Primary Examiner.*

JAMES O. THOMAS, Jr., *Examiner.*

ALBERT J. ADAMCIK, *Assistant Examiner.*